United States Patent
Friedrich

[11] 3,735,205
[45] May 22, 1973

[54] HOLDER FOR ELECTRICAL AND/OR ELECTRONIC COMPONENTS

[75] Inventor: Karl-Dieter Friedrich, Berlin 27, Germany

[73] Assignee: Schleicher GmbH & Co. Relaisbau KG, Berlin, Germany

[22] Filed: Apr. 2, 1971

[21] Appl. No.: 130,588

[30] Foreign Application Priority Data

Apr. 27, 1970  Germany....................P 20 21 978.7

[52] U.S. Cl..........317/100, 317/101 D, 317/101 DH
[51] Int. Cl................................................H05k 7/20
[58] Field of Search............317/99, 101 D, 101 DH, 317/100; 174/15 R, 16 R, DIG. 5

[56] References Cited
UNITED STATES PATENTS

| | | |
|---|---|---|
| 3,355,540 | 11/1967 | Newell..........................317/100 X |
| 3,527,989 | 9/1970 | Cuzner..........................317/100 |
| 3,596,140 | 7/1971 | Walsh..........................317/101 DH |
| 3,004,230 | 10/1961 | Levinsohn..........................317/101 D |
| 3,340,491 | 9/1967 | Deakin..........................317/101 D |

Primary Examiner—Robert K. Schaefer
Assistant Examiner—Gerald P. Tolin
Attorney—Paul M. Denk

[57] ABSTRACT

An inexpensive and easily made holder for electrical and/or electronic components of motor-driven time relays consists of a cage-like structure surrounding the motor casing and consisting of parallel plates of insulating material on which some at least of the components are located, with interposed spacers of thermally conducting material; one or more of the plates having a central aperture enabling it to be fitted over the casing of the electric motor while an end solid plate of the cage abuts against the end of the motor casing. The thermally conducting spacers can be used as heat sinks for transistors.

2 Claims, 1 Drawing Figure

Patented May 22, 1973 3,735,205
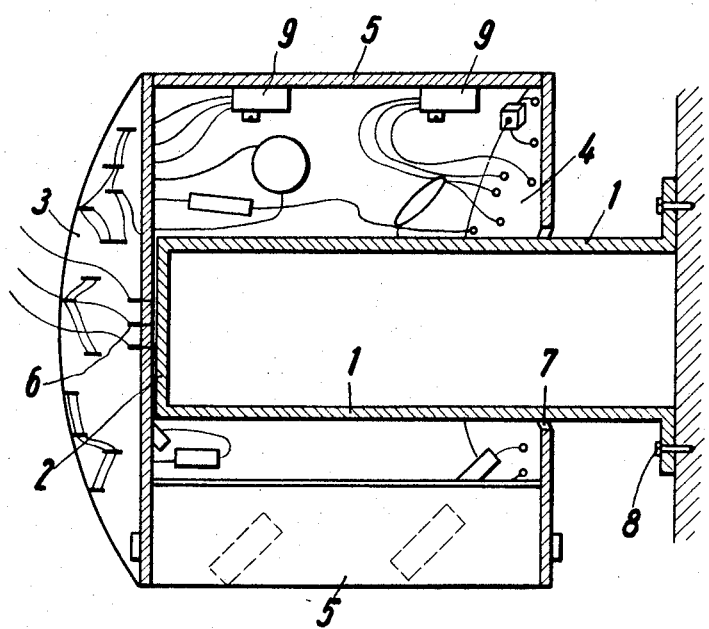
Inventor:
Karl Dieter Friedrich
By: Paul M. Denk
Attorney

HOLDER FOR ELECTRICAL AND/OR ELECTRONIC COMPONENTS

The invention relates to a holder for motor-driven electrical and/or electronic components in time relays or the like, in which holder the individual members are preferably disposed on plates of insulating material.

In electrical and electronic devices generally, there is a need to dispose the individual circuits and members used in these devices in a neat and, at the same time, space-saving manner as far as possible. This arrangement must be such, particularly in the case of mass-produced goods, that the manufacturing process can be carried out simply and as economically as possible, and also that clear and simple maintenance of the electrical and electronic equipment is ensured.

Even in the case of time relays, which are preferably incorporated, together with a plurality of other groups of circuits and circuit members, in switchboards, of the like, it is necessary to keep the dimensions of the said relays as small as possible. Because of their complex manner of functioning and wide time-preselection range, time relays which satisfy modern requirements possess a plurality of individual parts, such as, for example, an electric motor, a gearing system, a clutch with a corresponding lever system, an electromagnet and a series of contact members which are actuated selectively, either immediately or after a preselectable time-lag. In recent years, in particular, there has been a transition to the practice of no longer causing time relays to function exclusively via mechanical members, but of utilizing the advantages of electronics to an increasing extent for this purpose. Thus, modern time relays are also equipped with such elements as transistors, diodes, resistances, condensers and the like, which ensure functionally reliable operation of the relay and exact control of the electric motor, the rotational speed of which is preferably adjustable. In the case of relays of this type, one difficulty resides in the fact that the electrical and electronic switching elements have to be accommodated, in a neat and readily accessible form, in the casing of the time relay, while retaining the standard dimensions of the latter which were previously customary. In this connection, it it still an important requirement that it should be possible, in the event of defective circuits, to remove the latter without difficulty from the rest of the structure of the time relay, without it being necessary to dismantle the mechanical units.

The primary object of the invention is therefore to provide a holder for motor-driven electrical and/or electronic components in time relays or the like in which holder the individual members are preferably disposed on insulating plates which permit the neat arrangement of, and ready access to, the individual members and also make it possible to remove the latter with little manipulation.

This object is achieved, according to the invention, through the fact that a number of plates, which are joined together via spacers to form a permanent unit, are provided with preferably central, cut-out portions or perforations in such a way that they can be pushed on to the motor casing, which serves as a holder, while one of the plates, which is brought to bear directly against the end face of the motor casing, can be fastened to the latter.

In this connection, it is also particularly advantageous if the soldered connections for supplying current to the motor simultaneously form the fastening pins for the plate which is brought into contact with the end face of the motor casing.

An essential feature of the invention also resides in the fact that the spacers between the individual plates carry temperature-sensitive electronic components such as transistors or the like, and consist of a material, for example aluminum, which has good thermal conductivity.

In a preferred embodiment of the invention there are disposed around the motor casing, two plates which are held parallel to each other by three spacers and have circular base surfaces and of which one plate is fitted, in the form of a ring over the motor casing, while the other, which is brought into contact with the end face of the latter, is constructed as a solid circular disc.

Owing to the fact that the casing of the electric motor, which is in any case necessary in a time relay, simultaneously serves as a holder for the individual plates which carry the electrical and electronic components, there is a reduction in the number of individual parts required and therefore also in the working processes necessary for production purposes. The motor casing is secured, for example by means of two screws, to the supporting structure of the time relay with the result that it is possible, by undoing these two crews, to remove the entire assembly of electronic components from the time relay together with the casing, to then check or replace it and, finally, to incorporate it in the time relay again in the same simple manner.

However, it is also possible, according to the invention, to remove the plates of insulating material which carry the electrical and electronic components from the time relay without detaching the casing, since, in this arrangement around the casing, the said plates are joined and fastened to the latter only via the soldering tags for the supply lines to the electric motor. These measures, too, make additional fastening devices for the plates superfluous.

Another advantageous embodiment of the invention, is to arrange that the plates, which are jointed together joined laminar spacers, form one unit wherein the said spacers, which reinforce the rigidity of the arrangement, simultaneously serve as heat-dissipating plates in the event of temperature-sensitive electronic components being used. For example, transistors which have a temperature-dependent characteristic may be fastened to the relatively large spacers, in which event it is possible, in each case, to fasten those transistors which are coupled in a circuit, to one and the same spacer, so that the fluctuations in their characteristics which are caused by temperature are displaced in the same direction, as a result of which it is possible to balance out errors.

In order more clearly to understand the invention, reference is made to the accompanying drawing, which illustrates partly in perspective and partly in section, an embodiment of the invention.

The electric motor, which is encapsulated by means of the casing 1, of a time relay, represents part of a time relay assembly which is not illustrated. The motor casing 1 is held by two screws 8 on the rest of the structure of the time relay. Inverted above the motor casing 1 there is located the arrangement of electrical and electronic components which are wired together or electrically connected and are mounted in the space between the two plates 3 and 4 consisting of panels of insulating material. The plates 3 and 4 consist of a known insulating material, and are preferably constructed as printed circuit boards. The base surface of the plates is circular, so that they extend coaxially round the motor casing. To this end, the plate 4 is provided with a central perforation 7, the shape of which corresponds to the cross-section of the motor casing 1, and the size of which is kept somewhat larger than the outer diameter of the motor casing 1. In the embodiment illustrated, the motor casing 1 consists of a cylindrical body which is closed at the top, so the central cut-out portion or perforation 7 likewise has a round cross-section.

In contrast to the plate 4, the plate 3 is not an annular disc but a solid one since, after the entire plate arrangement has been placed in position on the motor casing 1, the said plate 3 lies flush against the end face 2 of the latter and therefore does not need to be brought down over the casing. The plates 3 and 4 are secured together via, preferably, three spacers 5 which hold the said plates parallel and at a distance from one another. Thus, the plates 3 and 4 and the spacers 5 together form a compact unit which can be attached by means of pins or the like located on the end face 6 of the motor casing 1. These pins at the same time form the soldering connections 6 for supplying current to the electric motor, with the result that the operation of soldering the leads on to the soldering connections simultaneously anchors the unit composed of the plates 3 and 4, to the motor casing 1.

The spacers 5, which ensure good thermal conductivity, are made from metal plates, such as aluminum plates or the like, having a relatively large surface area. Transistors 9, the characteristics of which are temperature-dependent, are mounted in permanent, heat-conducting contact with the said spacers 5. The remaining electrical and electronic components are soldered on the printed circuit boards or plates 3 and 4.

I claim:

1. In a component holder for supporting electrical and electronic components around an electrical motor comprising, a casing surrounding said electrical motor, a ring-like plate having an aperture therein of the size to allow for its insertion in sliding relationship upon and around said motor casing, a disc-like plate arranged parallel in a fixed distance from said first plate and disposed in abutting relationship against an end of the motor casing as the first plate is slid onto said casing, a series of spacers each arranged longitudinally of the motor casing and secured intermediate the two plates to form the holder into an integral unit, the disc-like plate being secured to the proximate casing end to fix the holder with respect to said motor casing, and electrical and electronic components being mounted upon said holder and being of the type to complement the operation of said motor.

2. The invention of claim 1 including circuit leads of the type that supply electrical current to a motor being mounted upon the end of said casing, said disc-like plate having openings therein to accommodate projection of said leads therethrough, said leads being fixed to said plate to support the integral holder upon said motor casing.

* * * * *